June 21, 1955  A. F. FEGERT  2,711,061
DUST COLLECTOR

Filed July 29, 1954  2 Sheets-Sheet 1

INVENTOR.
August F. Fegert.
BY
Harness, Dickey & Pierce
ATTORNEYS.

June 21, 1955  A. F. FEGERT  2,711,061
DUST COLLECTOR
Filed July 29, 1954  2 Sheets-Sheet 2
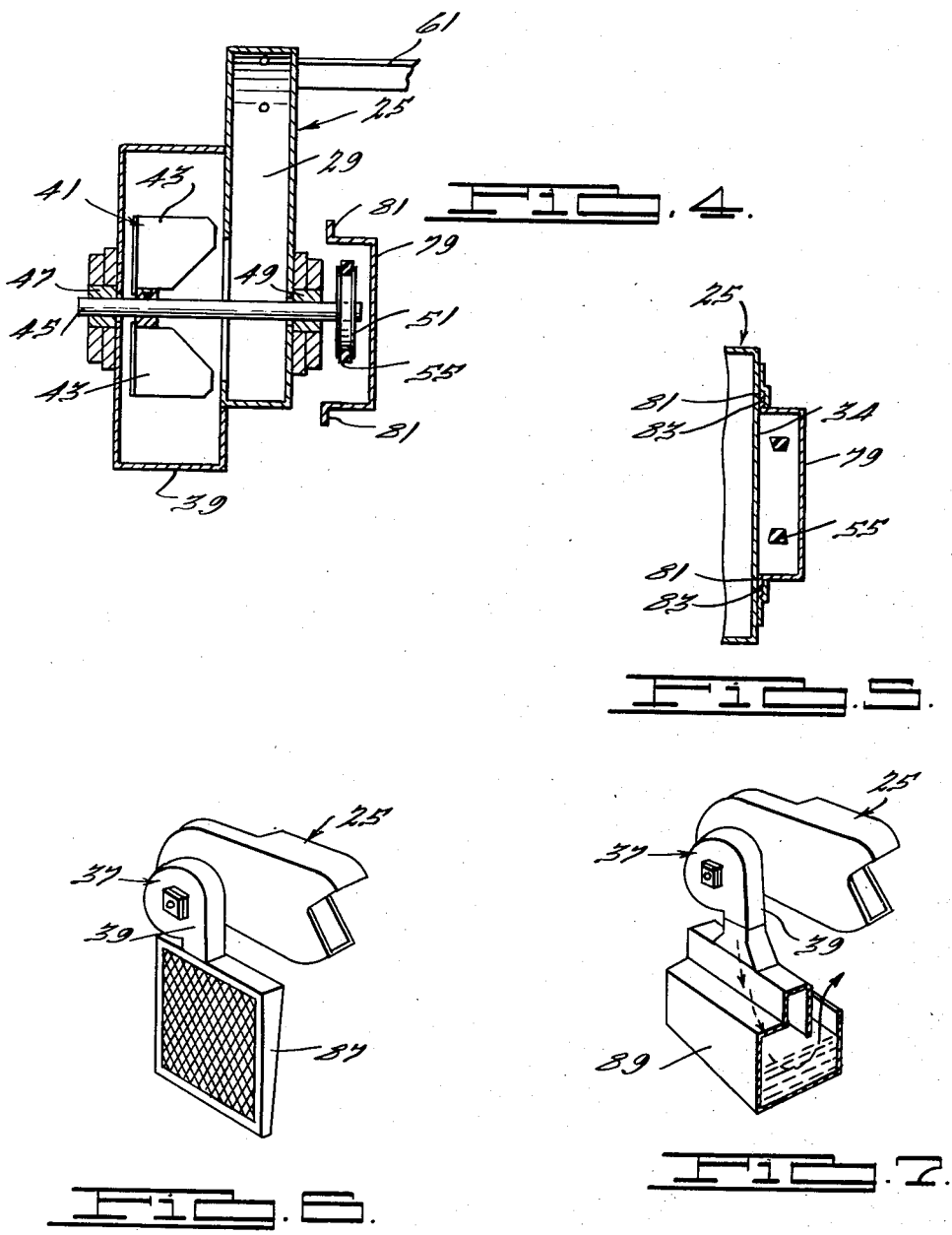
INVENTOR.
August F. Fegert
BY
Harness, Dickey & Pierce
ATTORNEYS.

United States Patent Office 2,711,061
Patented June 21, 1955

2,711,061

DUST COLLECTOR

August F. Fegert, Detroit, Mich., assignor to Gallagher-Kaiser Corporation, Detroit, Mich., a corporation of Michigan Application July 29, 1954, Serial No. 446,439

1 Claim. (Cl. 51—273)

This invention relates generally to dust collectors and more particularly to a compact type dust collector adapted to be directly mounted upon a machine of the type having a rotatably driven tool for removing material from a workpiece, wherein the dust collector exhaust blower means is driven by a rotating element of the machine itself.

In factories, shops, and the like, using workpiece material-removing equipment, such as griding machines, polishing machines, buffing machines, or other types of machines which remove material in fine particles, safety and health require that a suitable dust collector be provided in conjunction with each machine so that the particles removed from the workpiece cannot be distributed to the atmosphere around the machine and the machine operator, but will be trapped in a dust-arresting mechanism. Such dust collectors usually are cumbersome, space consuming, and expensive mechanisms which require motor-driven exhaust fans or blowers, as well as conduits and the like, for transmitting the particles from the machine to the dust-arresting media. Such dust-collecting devices, because of their size and cost, are not practical in many shops or factories, nor in cases where the machines may be moved from time to time.

It is an object of this invention to provide a dust collector unit which may be attached to and supported directly on a machine of the type for removing material from a workpiece and having a rotatable tool drive shaft.

It is a further object of this invention to provide a dust collector unit of the aforementioned type, in which the exhaust fan or blower of the unit is operatively connected with the rotatable tool shaft of the machine to which it is attached so that the exhaust fan is driven by the machine drive shaft.

It is a still further object of this invention to provide a dust collector unit of the aforementioned type, which is relatively inexpensive to manufacture, compact in structure, efficient in operation, and capable of having different types of dust-arresting media used in conjunction therewith.

It is a still further object of this invention to provide a dust collector unit of the aforementioned type, which also forms a hood for encompassing at least a portion of the machine tool and which is so constructed that the machine tool can be removed from the machine drive shaft without the necessity of removing the combination dust collector and hood structure.

It is a still further object of this invention to provide a dust collector unit of the aforementioned type in which adjustable means are provided for connecting the unit with a machine so that the unit's position on the machine can be varied to assure the proper power transmission and driving of the unit exhaust fan from the machine drive shaft.

It is a still further object of this invention to provide a dust collector unit of the aforementioned type, which is capable of having various types of dust-arresting media used therewith, and which is provided with various safety features to protect an operator against injury.

These and other objects of this invention will become apparent from the following detailed description, taken in conjunction with the accompanying drawings, in which:

Fig. 4 is a sectional view of the structure illustrated in Fig. 2, taken along the line 4—4 thereof;

Fig. 5 is an enlarged sectional view of the structure illustrated in Fig. 2, taken along the line 5—5 thereof;

Fig. 6 is a perspective view of a dust collector unit of this invention having a different dust-arresting medium provided thereon; and Fig. 7 is a view similar to Fig. 6, showing a still further embodiment of the invention wherein a still different dust-arresting medium is provided on the unit.

Figures 1, 2, 3:
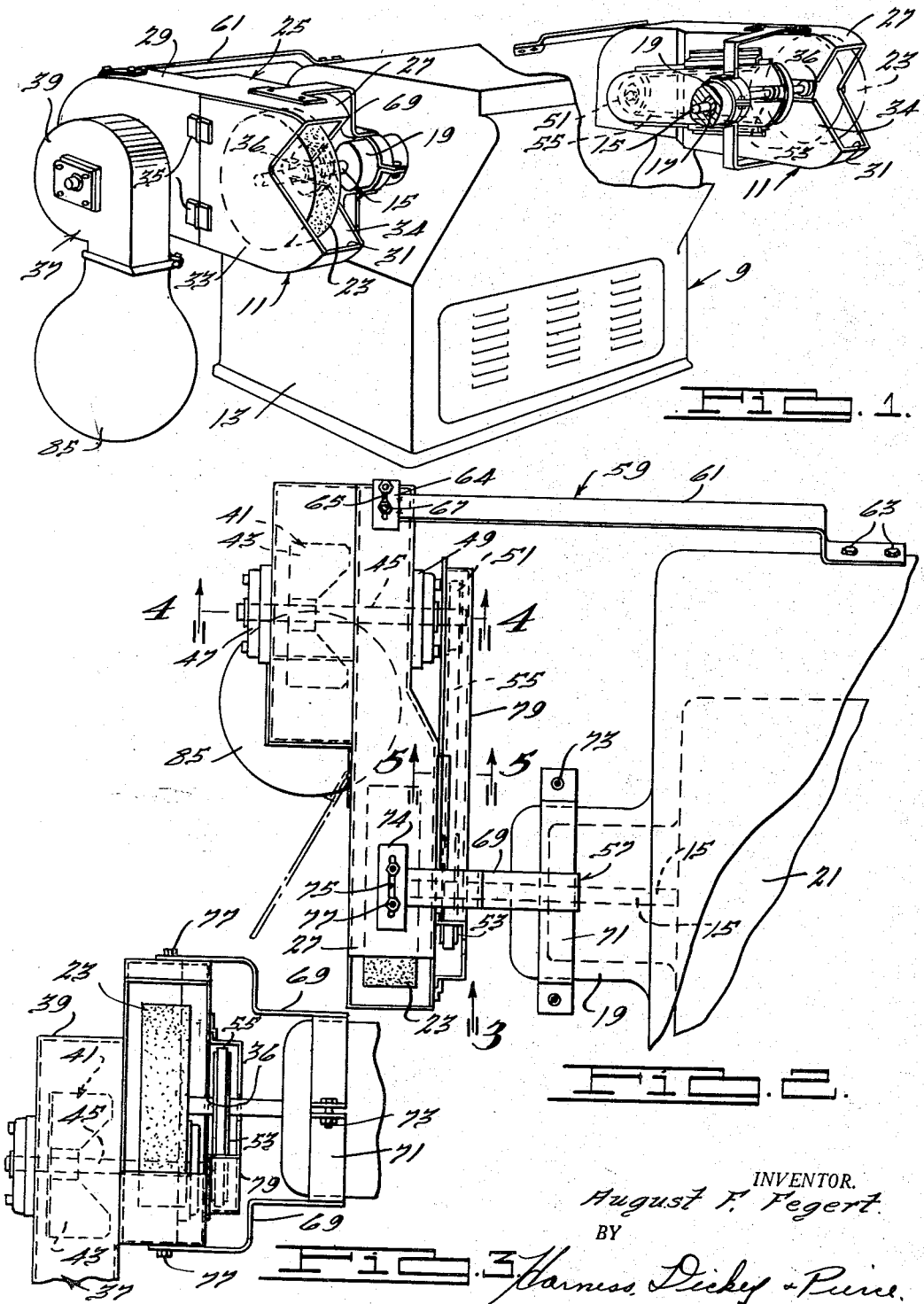
Figure 1 is a perspective view of a grinding machine having two motorless dust collector units of this invention connected therewith.
Fig. 2 is a fragmentary top elevation view of one of the dust collector units and the adjacent portion of the machine illustrated in Figure 1.
Fig. 3 is an end elevational view of the structure illustrated in Fig. 2, taken in the direction of the arrow 3 thereon.

Referring now to the drawings, it will be seen that a grinding machine 9 is illustrated, on each end of which a dust collector unit 11 of this invention is mounted. It will be appreciated that the dust collector units of this invention are adapted to be attached to various types of machines for removing material from workpieces, and that a grinding machine is shown merely for purposes of illustration.

The grinding machine 9 includes a stationary supporting structure 13 in which a drive shaft 15 is rotatably supported. The opposite ends of the drive shaft 15 extend laterally beyond the structure 13 and each end of the shaft is journalled in a suitable bushing 17 and hub-like housing portion 19. Suitable motor means 21 are provided for rotatably driving the shaft 15 through any suitable power transmission means. A grinding wheel 23 is carried on each end of the shaft 15, in laterally spaced relationship to the adjacent supporting structure hublike portion 19. When a workpiece is placed against a rotating grinding wheel the material so removed from the workpiece would be directed into the atmosphere adjacent to the machine unless prevented from doing so by a suitable dust collector and hood arrangement. Such an arrangement is a virtual necessity in shops and factories from health and safety standpoints. For this purpose the dust collector units 11 of this invention are provided, and each unit includes a hollow housing 25 providing adjacent the forward end thereof, a hood portion 27, and adjacent the rear end thereof, and rigid with the hood portion 27, hollow conduit means 29. The hollow housing 25 is provided with an access opening 31 at the front end thereof so that the hood encompasses the major portion of the grinding wheel but has an opening in the front to permit a workpiece to be positioned against the wheel. Material removed from the workpiece will be retained against displacement into the atmosphere by the hood and by the dust collector unit, as will be hereinafter described. It furthermore will be noted that the hood portion of the hollow housing 25 includes a wall portion 33 which is hingedly connected at 35 to the adjacent wall portion of a housing so that the wall portion 33 may be swung to an open position to permit the grinding wheel to be removed from the machine without the necessity of removing the dust collector unit. When the wall portion 33 is swung to its closed position it is flush with the adjacent wall portion and aids in retaining the material in the housing. The opposite wall portion 34 is slotted at 36 to permit the shaft 15 to extend therethrough.

Exhaust blower means 37 are connected with the hollow housing 25 adjacent the back end thereof, and in the particular embodiment illustrated the exhaust blower means includes a generally spiral shaped hollow housing portion 39 which communicates with the interior of the conduit means 29 of the hollow housing 25 and is rigid therewith. Disposed in the exhaust blower housing portion 39 is an exhaust fan 41 which includes a plurality of circumferentially spaced blades 43 supported on a shaft 45. One end of shaft 45 is rotatably supported in a suitable bearing or bushing structure 47 on the housing portion 39, while the opposite end of the shaft projects inwardly of and is supported on suitable bearing or bushing structure 49 on the inner wall of conduit means 29. A pulley or the like 51 is secured to the inner end of the shaft 45 and a pulley 53 is secured to the machine drive shaft 15 between the grinding wheel 23 and the supporting structure hub portion 19, in fore-and-aft alignment with the pulley 51. An endless member such as a belt 55 extends around the pulleys so that rotation of the shaft 15 will cause rotation of the shaft 45 through the power transmission means provided by the pulleys and endless belt member.

The dust collector unit 11 is adjustably secured to the machine supporting structure 13 by a forward bracket means 57 and rear bracket means 59. The rear bracket means 59 comprises a straplike bracket member 61 having its inner end anchored to the machine supporting structure at 63 by cap screws, bolts, or the like. The outer end of the strap bracket 61 carries an elongated plate member 64 having an elongated slot 65 therein through which cap screws, bolts, or the like 67 extend for anchorage on the dust collector unit hollow housing 25. The forward bracket means 57 includes laterally extending upper and lower straps 69 which are secured at their inner ends to a collarlike member 71 which encompasses and is clamped to the hub portion 19 of the machine supporting structure 13 by suitable bolts or cap screws 73. The outer end of each bracket strap 69 carries a fore-and-aft elongated plate 74 which has an elongated slot 75 therein through which bolts or cap screws 77 extend for anchorage in the dust collector unit housing 25. By loosening the bolts or cap screws 67 and 77 the dust collector unit can be adjusted or shifted fore and aft of the machine supporting structure 13 to provide proper belt tension between the pulleys 53 and 51, so as to insure proper power transmission from the machine drive shaft 15 to the dust collector fan shaft 45.

A suitable belt guard 79 is provided, which encompasses the belt 55. The belt guard has vertically extending upper and lower flanges 81 which are received in suitable ways 83 provided on the inner wall 34 of the hollow housing so that the belt guard may be slipped on and off of the unit to permit the belt to be replaced if desired.

A suitable dust-arresting medium is connected with the exhaust blower fan housing portion 39 so that material removed from a workpiece will be drawn rearwardly through the hollow housing 25 by the fan blades and will be deposited in a relatively conventional manner in the dust-arresting medium. In the embodiment of the invention illustrated in Figure 1, a bag 85 is connected to the outlet end of the exhaust blower for receiving and retaining the material discharged from the exhaust blower fan. In the embodiment illustrated in Fig. 6 a filter-type dust-arresting medium 87 of a conventional type is illustrated as connected with the exhaust blower; while in the embodiment illustrated in Fig. 7 a waterbath type of dust-arresting medium 89 is connected with the exhaust blower. Various types of dust-arresting media may therefore be connected with the exhaust blower for retaining material removed from a workpiece.

It will thus be appreciated that the dust collector units of this invention are of the type which are driven from the rotatable shaft of the machine and the units are mounted directly on the machine so as to be in effect portable, or at least movable, with the machine, and the units do not consume any considerable amount of factory floor space, and provide a simple, inexpensive and efficient dust collector adapted to be attached to any suitable type of workpiece material-removing machine, thus providing advantages not heretofore known in the art.

What is claimed is:

A dust collector unit for attachment to a device of the type having a stationary structure as well as a driven shaft rotatably supported in the structure and in which the shaft carries a tool for removing material from a workpiece; including a hollow housing having an opening in one end thereof adapted to encompass a portion of the device tool and be supported on the device stationary structure, means connected with said hollow housing and connectible to the device stationary structure for supporting the hollow housing thereon, a portion of one wall of said hollow housing, adjacent one end of the same, being hinged to said hollow housing so as to be swingable between a closed position and an open position wherein a tool can be removed from its shaft without removing the housing, the opposite wall of said hollow housing having a slot extending inwardly from the end thereof to permit said hollow housing to be inserted over the device shaft, exhaust blower means connected with said hollow housing and communicating with the interior thereof adapted to withdraw material removed from a workpiece through said hollow housing, said exhaust blower means including a shaft rotatably supported in said hollow housing, fan blades connected with said shaft, dust-arresting means connected with said exhaust blower means to receive and retain material drawn through said hollow housing by said blower means, a pulley on said exhaust fan shaft exteriorly of said hollow housing, a second pulley disposed in alignment with said first pulley and connectible to the shaft of the device, endless beltlike means extending around said pulleys so that rotation of the device shaft will drive the fan shaft, a belt guard device encompassing said pulleys and belt, and means providing ways on said hollow housing, said way means engaging said guard to releasably retain the same in a desired position but permitting said guard to be slid onto and off of said hollow housing.

References Cited in the file of this patent

UNITED STATES PATENTS

| Number | Name | Date |
| --- | --- | --- |
| 776,156 | Venderbush | Nov. 29, 1904 |
| 807,530 | Yuerks | Dec. 19, 1905 |
| 1,148,533 | Platt | Aug. 3, 1915 |
| 1,160,628 | Luden | Nov. 16, 1915 |
| 1,177,342 | Leiman | Mar. 28, 1916 |
| 1,621,931 | Johnson | Mar. 22, 1927 |
| 1,642,171 | Reavis | Sept. 13, 1927 |
| 1,701,815 | Maddox | Feb. 12, 1929 |
| 1,809,922 | Abramowitz | June 16, 1931 |
| 1,945,864 | Olsen | Feb. 6, 1934 |
| 2,252,455 | Bishel | Aug. 12, 1941 |
| 2,291,550 | Heinichen | July 28, 1942 |
| 2,379,503 | Teager | July 3, 1945 |